(12) United States Patent
Weng et al.

(10) Patent No.: US 8,121,358 B2
(45) Date of Patent: Feb. 21, 2012

(54) METHOD OF GROUPING IMAGES BY FACE

(75) Inventors: Chung-Yi Weng, Taichung (TW); Wei-Ting Tsai, Kaohsiung (TW); Chi-Ming Lee, Taipei County (TW)

(73) Assignee: Cyberlink Corp., Xindian Dist., New Taipei (TW)

(*) Notice: Subject to any disclaimer, the term of this patent is extended or adjusted under 35 U.S.C. 154(b) by 603 days.

(21) Appl. No.: 12/399,018

(22) Filed: Mar. 6, 2009

(65) Prior Publication Data
US 2010/0226584 A1 Sep. 9, 2010

(51) Int. Cl.
*G06K 9/00* (2006.01)
(52) U.S. Cl. .......................... 382/118; 382/225
(58) Field of Classification Search ................. 382/118
See application file for complete search history.

(56) References Cited

U.S. PATENT DOCUMENTS

| | | | |
|---|---|---|---|
| 6,792,134 B2 * | 9/2004 | Chen et al. ............ | 382/117 |
| 7,058,209 B2 * | 6/2006 | Chen et al. ............ | 382/117 |
| 7,120,279 B2 * | 10/2006 | Chen et al. ............ | 382/118 |
| 7,403,642 B2 | 7/2008 | Zhang et al. | |
| 7,835,541 B2 * | 11/2010 | Lee et al. ............. | 382/103 |
| 8,014,572 B2 * | 9/2011 | Xiao et al. ............ | 382/118 |
| 8,031,914 B2 * | 10/2011 | Zhang ................. | 382/118 |
| 8,036,432 B2 * | 10/2011 | Kim et al. ............. | 382/118 |
| 2002/0103813 A1 | 8/2002 | Frigon | |
| 2003/0001879 A1 | 1/2003 | Lin et al. | |
| 2003/0210808 A1 * | 11/2003 | Chen et al. ............ | 382/118 |
| 2003/0227468 A1 | 12/2003 | Takeda | |
| 2004/0120554 A1 * | 6/2004 | Lin et al. ............. | 382/118 |
| 2004/0151371 A1 * | 8/2004 | Chen et al. ............ | 382/165 |
| 2005/0105780 A1 * | 5/2005 | Ioffe ................. | 382/118 |
| 2005/0105806 A1 | 5/2005 | Nagaoka et al. | |
| 2006/0056737 A1 | 3/2006 | Ohtsuka et al. | |
| 2006/0251292 A1 | 11/2006 | Gokturk et al. | |
| 2007/0186189 A1 | 8/2007 | Schiller | |
| 2007/0206844 A1 * | 9/2007 | Russakoff et al. ....... | 382/132 |
| 2007/0237364 A1 | 10/2007 | Song et al. | |
| 2007/0296863 A1 * | 12/2007 | Hwang et al. .......... | 348/563 |
| 2008/0166027 A1 * | 7/2008 | Jeong et al. ........... | 382/118 |
| 2008/0298766 A1 | 12/2008 | Wen | |
| 2008/0304755 A1 * | 12/2008 | Xiao et al. ............ | 382/225 |
| 2009/0316962 A1 * | 12/2009 | Sun et al. ............. | 382/118 |
| 2010/0226584 A1 * | 9/2010 | Weng et al. ........... | 382/225 |
| 2010/0238191 A1 | 9/2010 | Lee | |

FOREIGN PATENT DOCUMENTS

| | | |
|---|---|---|
| JP | 2002169810 A | 6/2002 |
| JP | 200549968 A | 2/2005 |
| JP | 2005148900 A | 6/2005 |
| JP | 2006318034 A | 11/2006 |
| JP | 2008217335 A | 9/2008 |
| WO | 2007117448 A2 | 10/2007 |

* cited by examiner

*Primary Examiner* — Sath V Perungavoor
(74) *Attorney, Agent, or Firm* — Winston Hsu; Scott Margo (57) ABSTRACT

A method of browsing face regions in digital images in a photo displaying system includes detecting a plurality of face regions from a plurality of images, grouping the face regions into a plurality of clusters based on similarities of the face regions, determining a degree of connection between the clusters, modifying the degree of connection between the clusters according to a relationship of the face regions, and displaying the face regions according to the degree of connection between the clusters.

17 Claims, 9 Drawing Sheets

|   | Face region | Image (index) | Album (path) | Cluster |
|---|---|---|---|---|
| 70 | R1 | A | Album I | Person A |
| 71 | R2 | A | Album I | Person B |
| 72 | R3 | B | Album I | Person A |
| 73 | R4 | B | Album I | Person C |
| 74 | R5 | C | Album II | Person B |
| 75 | R6 | C | Album II | Person D |
| 76 | R7 | C | Album II | Person E |
| 77 | R8 | D | Album I | Person C |
| 78 | R9 | D | Album I | Person D |
| 79 | R10 | D | Album I | Person E |

METHOD OF GROUPING IMAGES BY FACE

BACKGROUND OF THE INVENTION

1. Field of the Invention

The present invention relates to methods for grouping images by face, and more particularly, to a method of grouping images by face based on group photo information.

2. Description of the Prior Art

Digital photography has revolutionized both professional and consumer photography. Elimination of physical film in digital cameras makes photography more cost effective by reducing film and photo development costs. Further, hundreds or thousands of digital images captured by the digital camera may be stored in a single flash memory card, such as a CompactFlash (CF) card, a Secure Digital (SD) card, or a Memory Stick (MS) device. Thus, digital photography has increased the number of people taking digital pictures, and also increased the number of pictures taken by each person, leading to a massive increase in the number of digital images generated by users.

Due to this increased amount of digital images generated and stored by users of digital cameras, organization of the digital images in a way that makes it easy for the user to locate and view a desired image becomes necessary. For example, the digital images may be timestamped, such that the digital images may be organized by date, month, or year. The digital images may also be tagged by the user, though this requires an inconvenient amount of manual input by the user.

Figure 1:
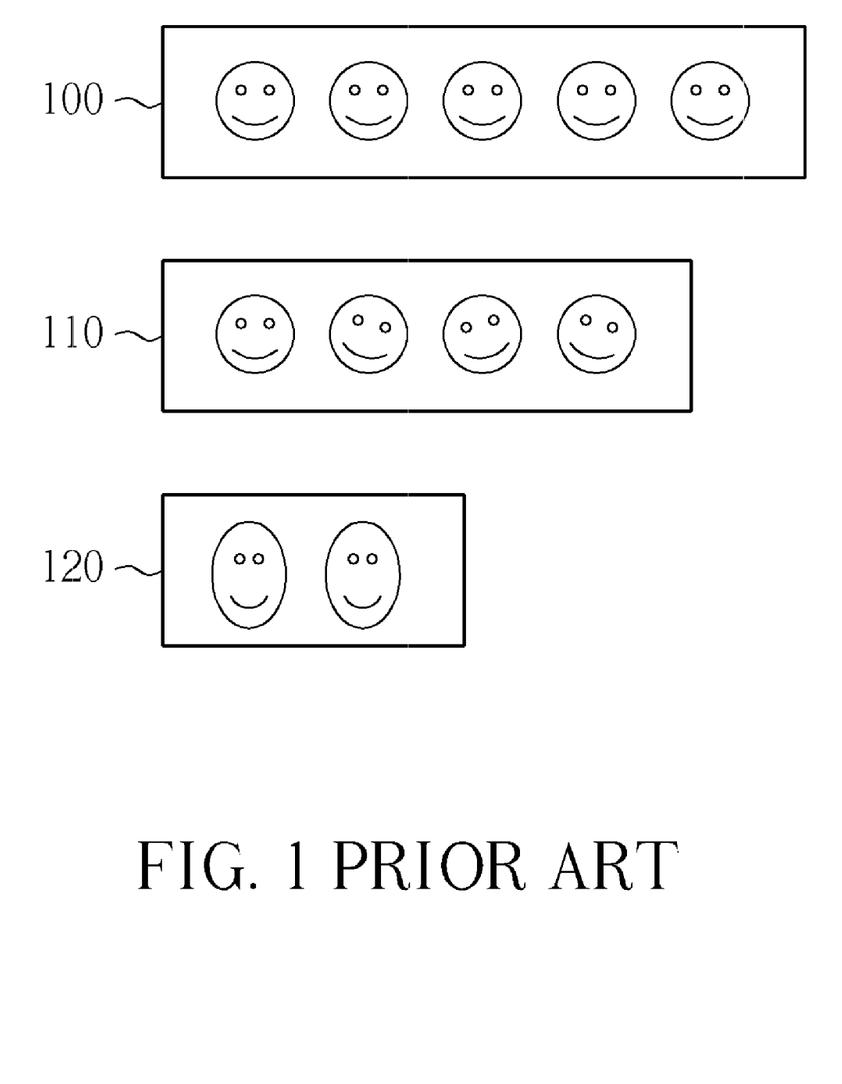
FIG. 1 is a diagram illustrating grouping face regions into groups according to the prior art.

More recently, face extraction algorithms have been developed for extracting face pixels from digital images, and face recognition algorithms may be utilized for grouping of images by face. In other words, face pixels from one image may be compared with face pixels from another image to determine similarity between the face pixels from these two images. If the face pixels from both images are sufficiently similar, the face recognition algorithm may group the images together. This is illustrated in FIG. 1. As shown, eleven face regions may be grouped into a first group 100, a second group 110, and a third group 120, respectively. Thus, the face recognition algorithm may determine who appears in the digital image, and multiple digital images may be linked by which people appear in the digital images. However, the face recognition algorithms used for comparing the face pixels of the multiple digital images often provide ambiguous results. In other words, even if the same person appears in two images, the algorithm may determine the same person is two different people if he/she is wearing a new set of glasses, or has put on make-up.

SUMMARY OF THE INVENTION

According to an embodiment of the present invention, a method of browsing face regions in digital images in a photo displaying system comprises detecting a plurality of face regions from a plurality of images, grouping the face regions into a plurality of clusters based on similarities of the face regions, determining a degree of connection between the clusters, modifying the degree of connection between the clusters according to a relationship of the face regions, and displaying the face regions according to the degree of connection between the clusters.

According to a second embodiment, a method of handling similar clusters comprises analyzing a plurality of images to generate a plurality of face regions, calculating facial similarity for each pair of face regions in the plurality of images, and grouping the plurality of face regions into a plurality of clusters based on the facial similarities. The clusters comprise a first cluster, a second cluster, and a third cluster. A first condition result is generated when a first face region of the first cluster appears with a third face region of the third cluster in a first image of the plurality of images, and a second face region of the second cluster appears with a fourth face region of the third cluster in a second image of the plurality of images. A second condition result is generated when degree of connection of the first cluster and the second cluster is greater than a connection threshold.

According to another embodiment, a photo displaying system comprises a detecting module, a grouping module, a social networking analyzing module, a modifying module, and a display. The detecting module is for detecting a plurality of face regions from a plurality of images. The grouping module is for grouping the face regions into a plurality of clusters based on a similarity of the face regions. The social networking analyzing module is for determining a degree of connection between the clusters according to the similarity between the face regions. The determining module is for modifying the degree of connection between the clusters based on a relationship between the clusters. And, the display is for outputting the face regions according to the degree of connection.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
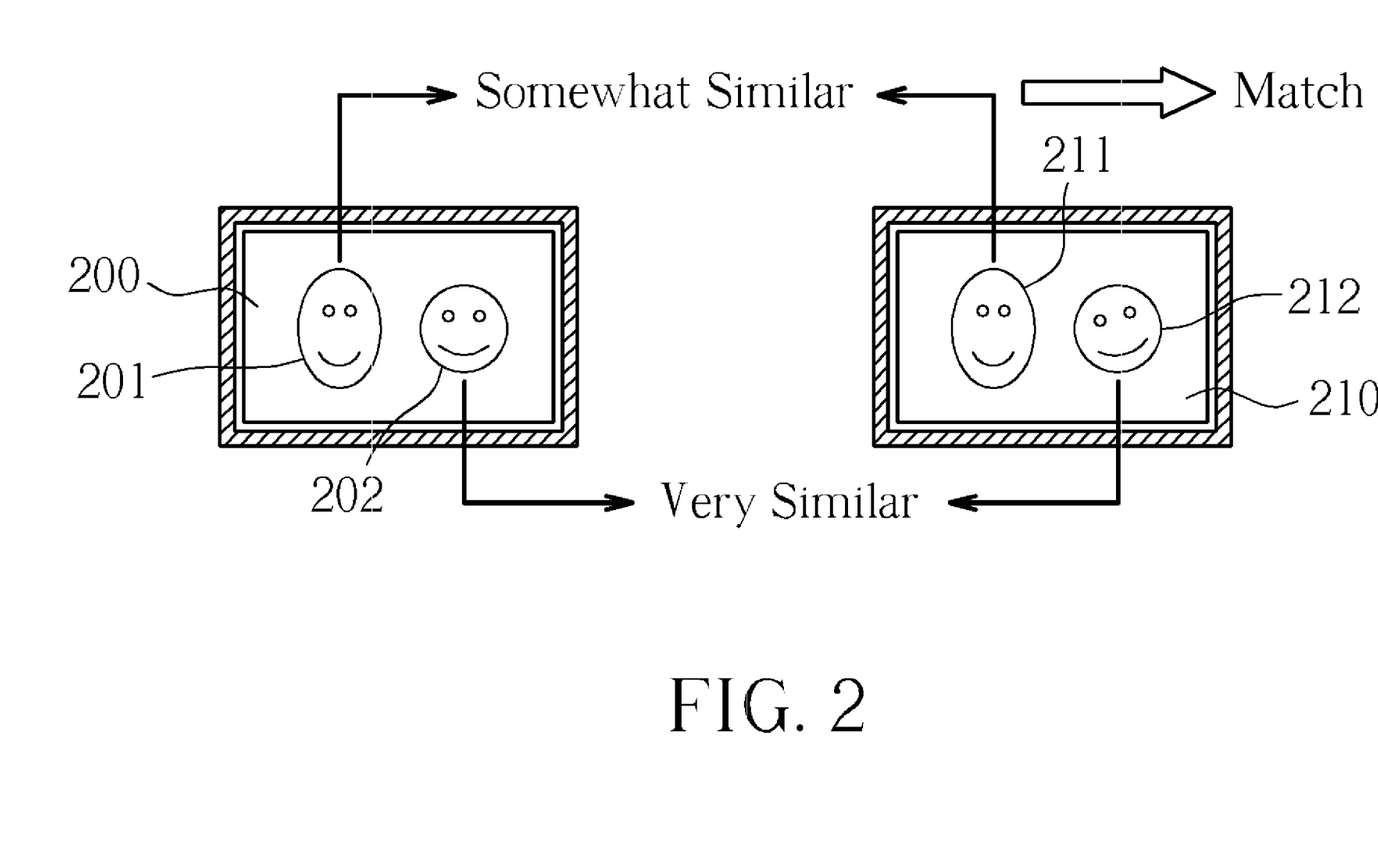
FIG. 2 is a diagram illustrating an example of identifying a first person and a second person in a first digital image and a second digital image.
Figure 3:
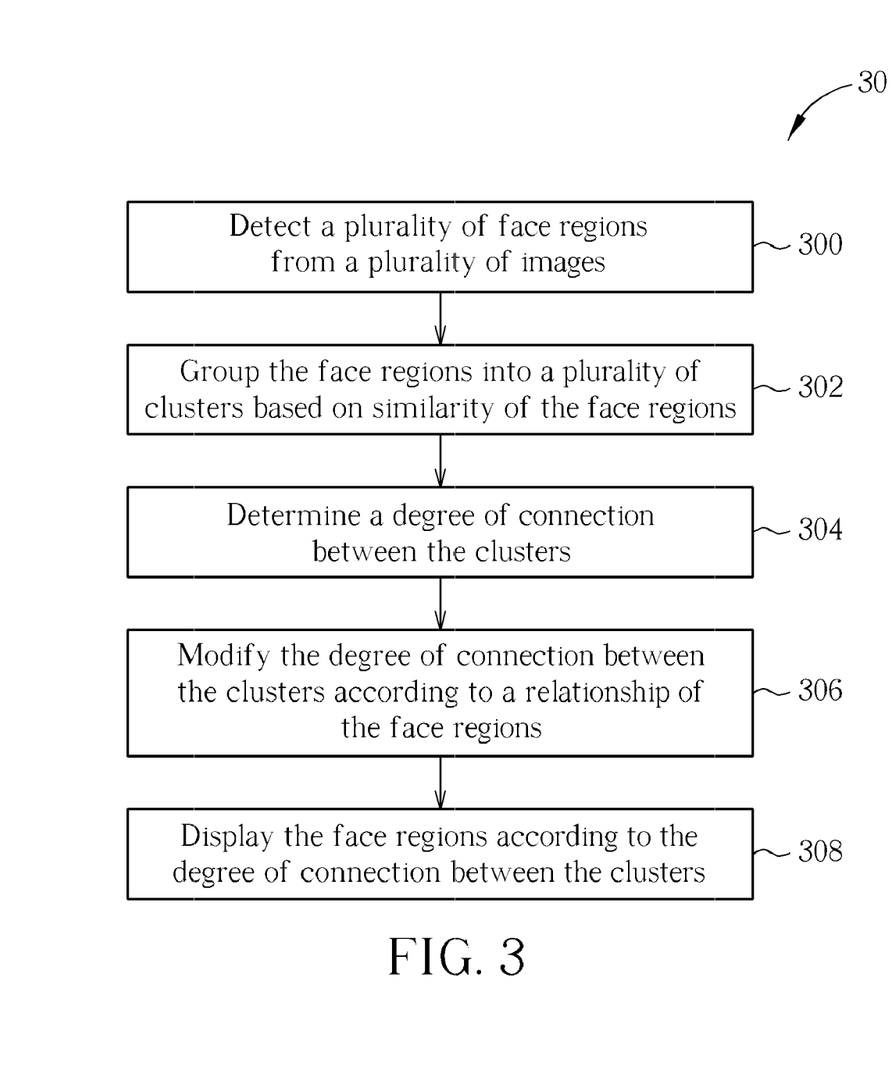
FIG. 3 is a flowchart of a process for browsing face regions in digital images in a photo displaying system according to a first embodiment.

Please refer to FIG. 2 and FIG. 3. FIG. 2 is a diagram illustrating an example of identifying a first person and a second person in a first digital image 200 and a second digital image 210 of a plurality of images according to a first embodiment. FIG. 3 is a flowchart of a process 30 for browsing face regions in digital images in a photo displaying system according to the first embodiment. In the process 30 shown in FIG. 3 and illustrated in FIG. 2, likelihood exists that people appearing in one group photo together tend to appearing in other group photos together. In other words, a person's group photo history may provide information that aids identification of other people in group photos with the person.

In FIG. 2, the first digital image 200 includes a first face region 201 and a second face region 202. Likewise, the second digital image 210 includes a third face region 211 and a fourth face region 212. Initially, the first face region 201, the second face region 202, the third face region 211, and the fourth face region 212 may be detected from the plurality of images (Step 300). Each face region may be a copy of pixels determined by a face extraction algorithm to correspond to a face of a member of each digital image. The face regions may also be compressed, or shrunken, copies of the pixels. If the second face region 202 corresponding to the first person is very similar to the fourth face region 212, it may be assumed that the fourth face region 212 also corresponds to the first person. Thus, the second face region 202 and the fourth face region 212 may be grouped into a cluster of a plurality of clusters, and likewise for each face region of the plurality of face regions (Step 302). Facial similarity may be calculated for each pair of face regions, such as the second face region 202 and the fourth face region 212, by comparing features, such as eyes, nose, mouth, etc. of the pair of face regions. If the facial similarity is high, e.g. greater than a facial similarity threshold, then a match may be generated. Although the first face region 201 and the third face region 211 may only be somewhat similar, e.g. not similar enough to match the two face regions under normal conditions, because they appear in the first digital image 200 and the second digital image 210 with the second face region 202 and the fourth region 212, which are very similar, probability that the first face region 201 and the third face region 211 correspond to the same cluster is greatly increased.

At this point, a degree of connection may be determined between the clusters (Step 304) and be modified according to a relationship for the face regions (Step 306). The degree of connection may be determined by selecting one of the similarities of the face regions. The relationship of the face regions may be created according to the face regions detected from the same image. In one embodiment, the relationship of a first face region and a second face region may be created if the first face region and the second face region are detected from the same image. Taking FIG. 2 as an example, a relationship may be established between the first face region 201 and the second face region 202, and a relationship may be established between the third face region 211 and the fourth region 212. The degree of connection between the clusters may be determined as follows. First, the similarity for each pair of face regions could be calculated by comparing the characteristic vectors of the face regions in the grouping Step 302. Furthermore, the degree of connection between the first cluster and the second cluster could be determined according to the similarity between one face region of the first cluster and one face region of the second cluster in Step 304. For example, the similarity between the first cluster and the second cluster may be representative of the most similar pair of the face regions of the clusters, the least similar pair of the face regions of the clusters, or the average of all similarity of each pair of face regions of the clusters. In another embodiment, the similarity between the first cluster and the second cluster may be obtained by comparing the average characteristic values of the face regions in the first cluster with the average characteristic values of the face regions in the second cluster. In other words, the degree of connection between the clusters is determined according to the similarity between the first cluster and the second cluster in Step 304. In order to optimize the degree of connection between the clusters, the degree of connection would be modified according to the relationship between the face regions in Step 306. In the current embodiment, a first image comprising a first face region belonging to a first cluster and a second face region not belonging to the first cluster are identified. A second image comprising a third face region belonging to a second cluster and a fourth face region not belonging to the second cluster are also identified. If the second face region from the first image and the fourth face region from the second image are grouped into the same cluster, e.g. a third cluster, the degree of connection between the first cluster and the second cluster may be modified (Step 306), e.g. according to the determining result being true. For example, the degree of connection between the first cluster and the second cluster may be increased when the first face region and the second face region are grouped into the third cluster. In another embodiment, if the second face region from the first image is similar with the fourth face region from the second image, the degree of connection between the first cluster and the second cluster may be modified (Step 306), e.g. according to the determining result being true. In another embodiment, the degree of connection between the first cluster and the second cluster may be increased when the first face region and the third face region are similar. For example, if the similarity between the first face region and the third face region is determined to be greater than a threshold, the degree of connection between the first cluster and the second cluster may be modified accordingly. In another embodiment, if similarity between the face regions in the first cluster and the face regions in the second cluster is determined to be greater than a threshold, the degree of connection between the first cluster and the second cluster may be modified (Step 306). For example, the degree of connection between the first cluster and the second cluster may be increased when the similarity between the face regions in the first cluster and the second cluster is determined to be greater than the threshold. In another embodiment, if the degree of connection between the first cluster and the second cluster is greater than a connection threshold, the first cluster and the second cluster may be merged.

During browsing, the plurality of face regions may be displayed organized by the plurality of clusters. Thus, the face regions may be displayed according to the degree of connection between the clusters (Step 308). In one embodiment, the face regions may be displayed in descending order of the degree of connection between the clusters. For example, if the first cluster is very similar to the second cluster, and the first cluster is slightly similar to the third cluster, the face regions of the second cluster may be displayed before the face regions of the third cluster when browsing the first cluster.

Figure 4:
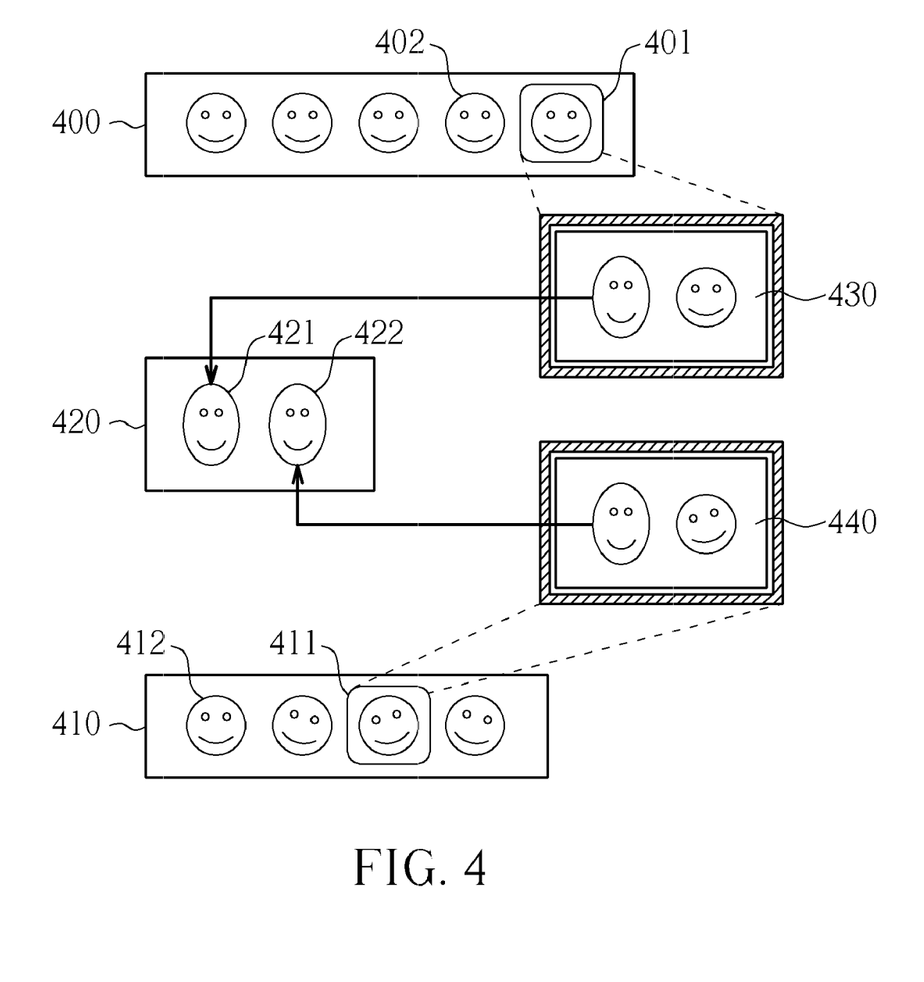
FIG. 4 is a diagram illustrating matching clusters based on group photo information according to a second embodiment.
Figure 5:
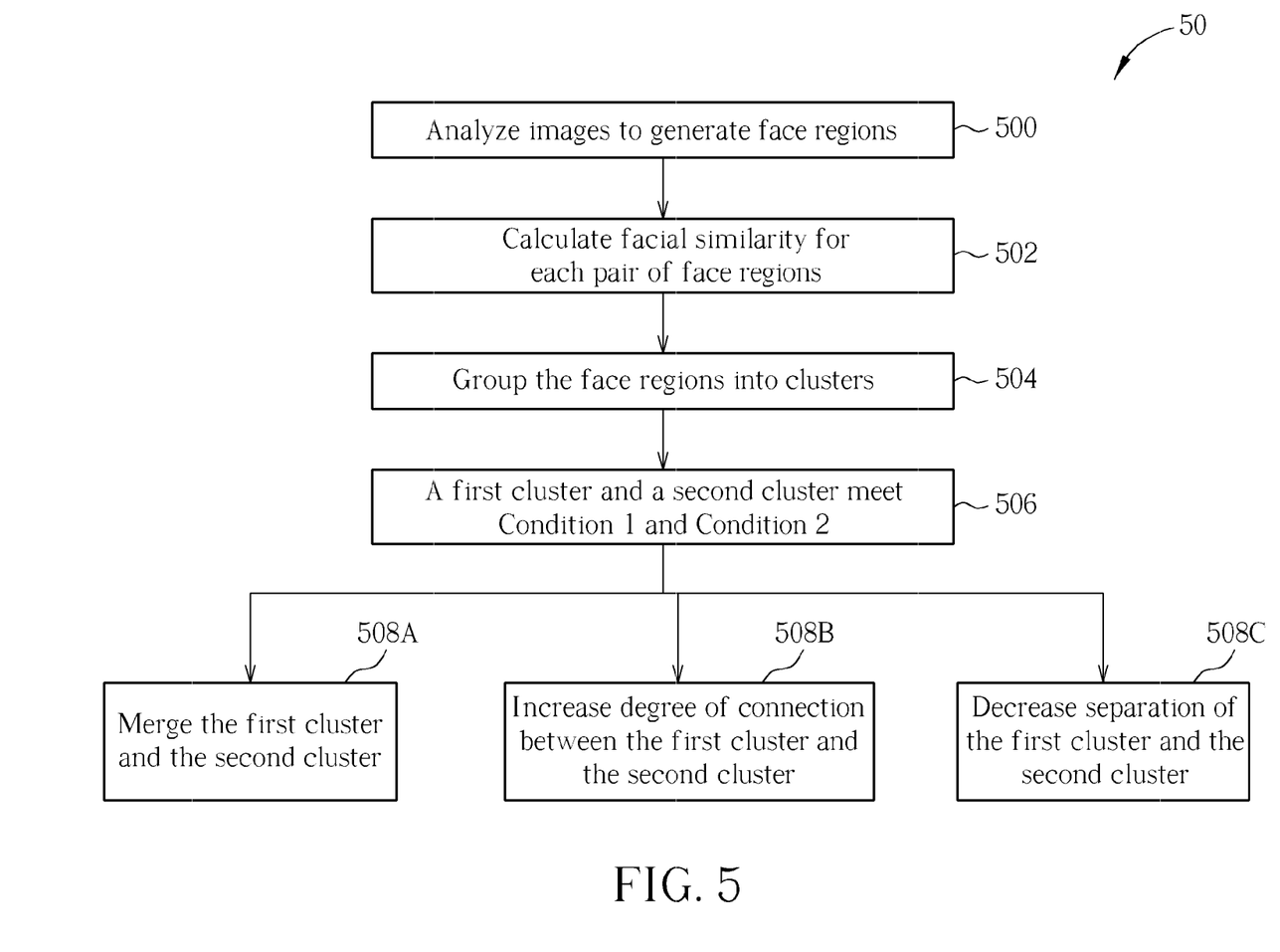
FIG. 5 is a flowchart of a process for handling similar clusters according to the second embodiment.

Please refer to FIG. 4 and FIG. 5. FIG. 4 is a diagram illustrating matching clusters based on group photo information according to a second embodiment. FIG. 5 is a flowchart of a process 50 for handling similar clusters according to the second embodiment. Initially, a plurality of digital images in a database are analyzed to generate a plurality of face regions (Step 500). Then, facial similarity is calculated for each pair of face regions in the plurality of digital images (Step 502). Based on the facial similarities, the face regions are grouped into a plurality of clusters (Step 504). For example, as shown in FIG. 4, eleven face regions may be grouped into a first cluster 400, a second cluster 410, and a third cluster 420 based on the facial similarities.

For any two clusters of the plurality of clusters, e.g. the first cluster 400 and the second cluster 410, two conditions may be met. First, a first face region 401 of the first cluster 400 appears with a third face region 421 of the third cluster 420 in a first image 430, and a second face region 411 of the second cluster 410 appears with a fourth face region 422 of the third cluster 420 in a second image 440 (Condition 1). Second, the first cluster 400 and the second cluster 410 are sufficiently similar (Condition 2). If a first condition result (Condition 1) and a second condition result (Condition 2) are both true (Step 506), the following actions may be taken:

Step 508A: Merge the first cluster 400 and the second cluster 410.

Step 508B: Increase degree of connection between the first cluster 400 and the second cluster 410.

Step 508C: Decrease separation between the first cluster 400 and the second cluster 410 when displaying the first cluster 400 and the second cluster 410.

In the above, degree of connection, which may be calculated to determine how similar any two clusters are to each other, may be incorporated as a condition for taking any of the three actions when the first face region 401 of the first cluster 400 appears with the third face region 421 of the third cluster 420 in the first image 430, and the second face region 411 of the second cluster 410 appears with the fourth face region 422 of the third cluster 420 in the second image 440.

Furthermore, a connection threshold may be set for comparing the degree of connection with the connection threshold to determine whether the degree of connection meets Condition 2. For example, if the degree of connection for the first cluster 400 and the second cluster 410 is greater than or equal to the connection threshold, Condition 2 is met, and the first cluster 400 and the second cluster 410 may be merged, e.g. by merging the second cluster 410 into the first cluster 400 or vise versa, or by generating a new cluster comprising the respective face regions of the first cluster 400 and the second cluster 410 (Step 508A). The degree of connection between the first cluster 400 and the second cluster 410 may also be increased in response to meeting Condition 1 and Condition 2 (Step 508B). And, the first cluster 400 and the second cluster 410 may be displayed in closer proximity (Step 508C). In the current embodiment, the displaying of the clusters will be refreshed in response to the degree of connection. In other words, the visual separation between the first cluster and the second cluster is decreased while the degree of connection between the first cluster and the second cluster is increased. In one embodiment, the plurality of clusters may be displayed in descending order of degrees of connections between the first cluster and each of the plurality of clusters. Though initially one or more intervening clusters may separate the first cluster 400 and the second cluster 410 during display. By sorting based on the degree of connection, the second cluster 410 may be displayed closer to the first cluster 400 than any of the intervening clusters if the degree of connection between the first cluster 400 and the second cluster 410 is higher than that between the first cluster 400 and any intervening cluster. In other words, the second cluster 410 may move up in line, being displayed more closely following the first cluster 400 than the initial intervening clusters.

Again, taking the first cluster 400 and the second cluster 410 as an example, if a fifth face region 402 of the first cluster 400 is very similar with a sixth face region 412 of the second cluster 410, and if the first cluster 400 has a sufficiently high degree of connection with the second cluster 410, a number of actions may be taken. First, the first cluster 400 and the second cluster 410 may be merged. The degree of connection for the first cluster 400 and the second cluster 410 may be increased. And, when displaying the first cluster 400 and the second cluster 410, the first cluster 400 and the second cluster 410 may be displayed in closer proximity.

From another perspective, all face regions appearing in group photos with the face regions of the first cluster 400 may be analyzed, and all face regions appearing in group photos with the face regions of the second cluster 410 may be analyzed. One face region appearing in a group photo with a face region of the first cluster 400 may have very high facial similarity with another face region appearing in a group photo with a face region of the second cluster 410. In this situation, a degree of connection between the first cluster 400 and the second cluster 410 correspond to the same person may be increased (Step 508B). For example, the third face region 421 of the first cluster 400 and the fourth face region 422 of the second cluster 410 may be highly similar. Thus, the degree of connection between the first cluster 400 and the second cluster 410 may be increased. Likewise, if the third face region 421 and the fourth face region 422 are assigned to the same group, e.g. the third cluster 420, the degree of connection may be increased. Then, if the degree of connection of the first cluster 400 and the second cluster 410 is sufficiently high, and if the degree of connection is greater than a threshold, the first cluster 400 and the second cluster 410 may be merged. Finally, during display, the first cluster 400 and the second cluster 410 may be pulled closer together by a distance or number of clusters proportional to the degree of connection.

Figure 6:
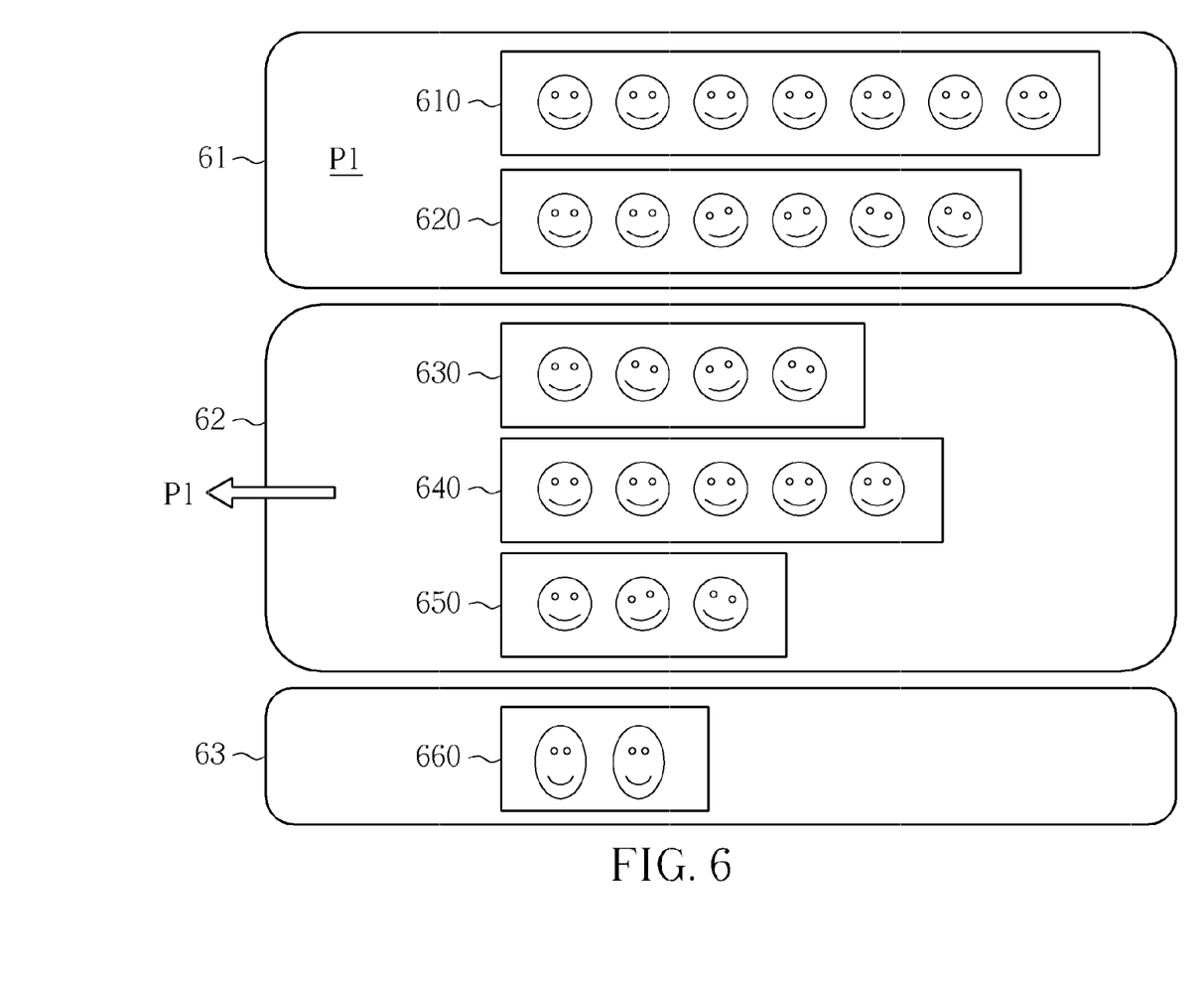
FIG. 6 is a diagram illustrating displaying clusters according to the second embodiment.

Please refer to FIG. 6, which is a diagram illustrating display of face groups based on the above embodiments. When a user is organizing or browsing photos, the user may initially select a first cluster 610, so as to browse all images in which a person P1 appears. Then, in a browser window, the first cluster 610, a second cluster 620, a third cluster 630, a fourth cluster 640, a fifth cluster 650, and a sixth cluster 660 may be displayed. The first cluster 610 and the second cluster 620 may already be identified as corresponding to the person P1 based on degree of connection, and form a first category 61. The third, fourth, and fifth clusters 630, 640, 650 may initially be grouped together into a second category 62 based on lower degree of connection with the first cluster 610, and likewise the sixth cluster 660 may form a third category 63. The first category 61 may be for face groups having degree of connection with the first cluster 610 above a first threshold, the second category 62 may be for face groups having degree of connection with the first cluster 610 above a second threshold, and so on. Of course, it is not necessary to categorize the clusters 610, 620, 630, 640, 650, 660 into the first category 61, the second category 62, and the third category 63. The clusters 620, 630, 640, 650, 660 may also be displayed below the first cluster 610 in order of decreasing degree of connection with the first cluster 610.

At this point, the user may easily label the first category 61 with name of the person P1, thereby applying the name to both the first cluster 610 and the second cluster 620. Then, if the user determines that the fourth cluster 640 also contains face regions corresponding to the person P1, the user may group the fourth cluster 640 with the first and second clusters 610, 620 by labeling the fourth cluster 640 with the name of the person P1.

Figure 7A:
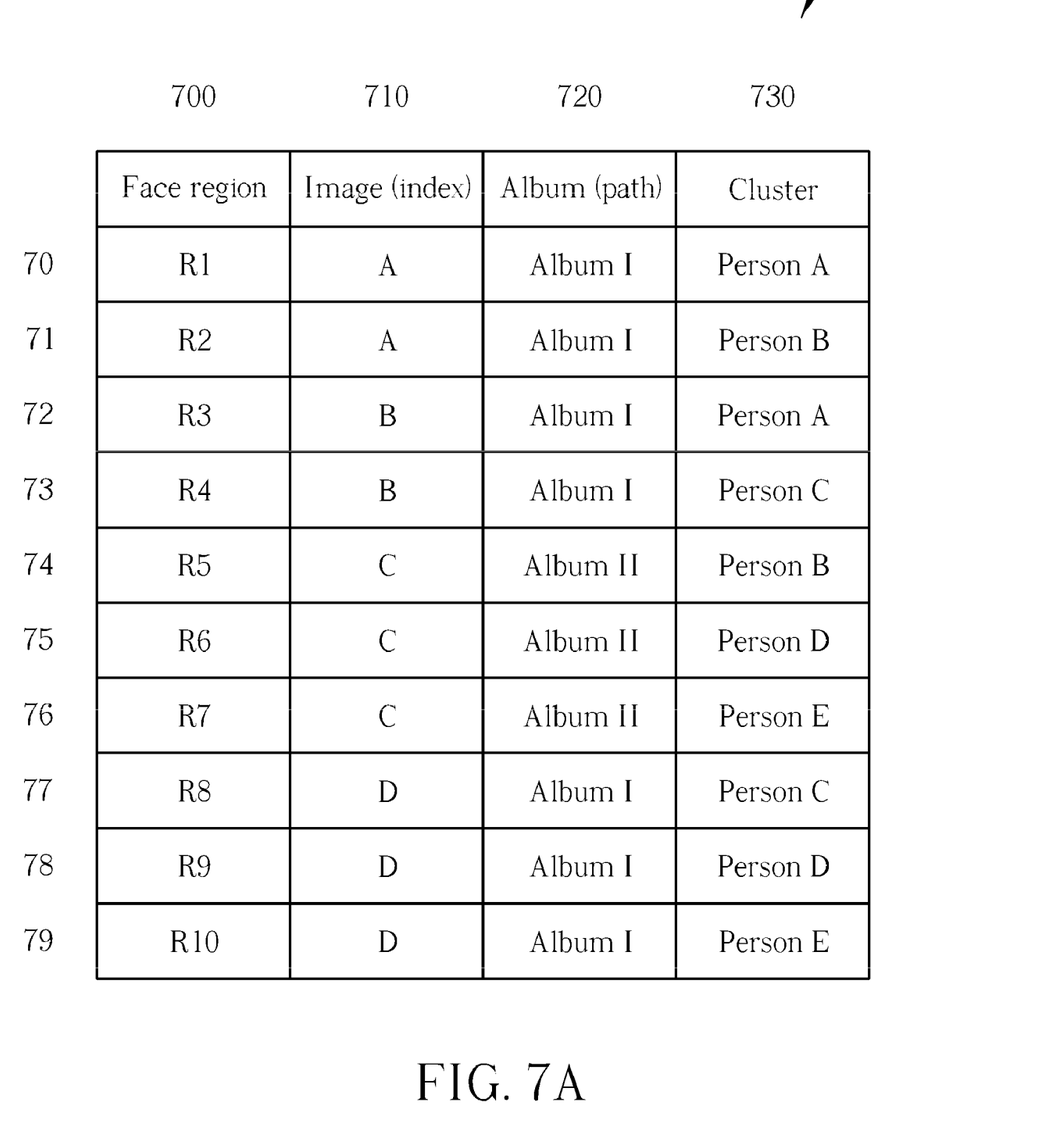
FIG. 7A is a diagram of a table linking face region, image, album, and cluster according to one embodiment.
Figure 7B:
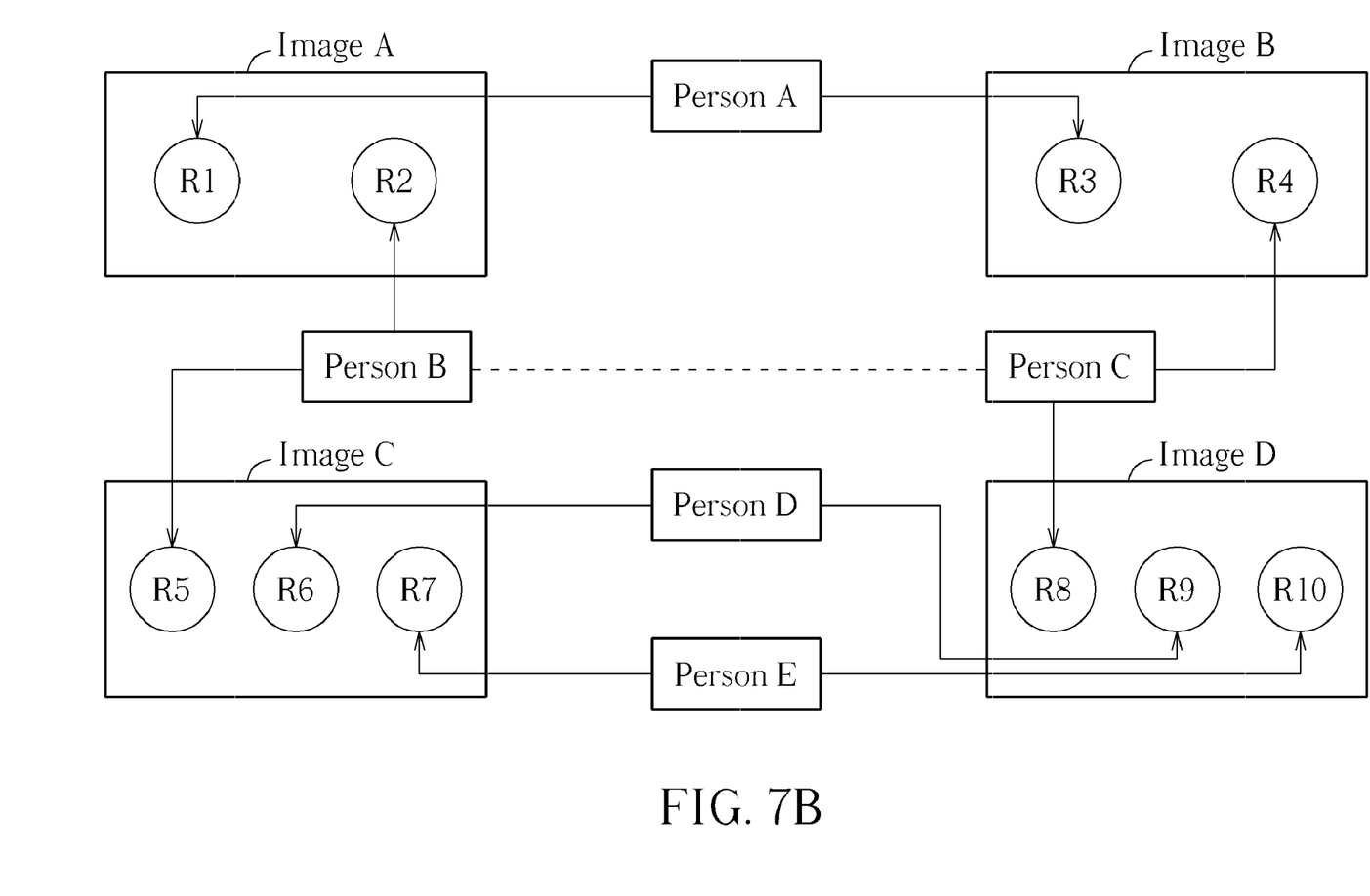
FIG. 7B is a diagram illustrating the face regions, images, and clusters of the table of FIG. 7A.

Please refer to FIG. 7A and FIG. 7B. FIG. 7A is a diagram of a table 7 linking face region, image (index), album (path), and cluster according to one embodiment. FIG. 7B is a diagram illustrating the face regions, images, and clusters of the table 7. The table 7 includes a face region field 700, an image field 710, an album field 720, and a cluster field 730. Rows 70-79 of the table store information linking each face region to an image, an album, and a cluster. The cluster could be obtained according to the previous methods of the current invention. For example, there are three Images, i.e. Image A, Image B and Image D, from Album I, and one image, Image C, from Album II. In cooperation with the method shown in the first embodiment, the face regions R1 and R2 are extracted from Image A, the face regions R3 and R4 are extracted from Image B, face regions R5, R6 and R7 are extracted from Image C, and face regions R8, R9 and R10 are extracted from Image D after executing the detecting step 200 shown in FIG. 3. After executing the grouping step 202 shown in FIG. 3, the face regions R1, R3 are grouped into the same cluster "Person A" because the face region R1 is similar to the face region R3. Similarly, the face regions R2, R5 are grouped into the cluster "Person B", the face regions R4, R8 are grouped into the cluster "Person C", the face regions R6, R9 are grouped into the cluster "Person D", and the face regions R7, R10 are grouped into the cluster "Person E" based on the similarities of the face regions R1-R10. The degrees of connection between the clusters are determined based on the similarity analysis on the face regions in Step 304 shown in FIG. 3. In Step 306 shown in FIG. 3, a relationship between the cluster "Person B" and the cluster "Person C" is determined from the social information of the group photos. Because specific groups of people, such as friends, classmates, or family members, will take photos together, the face regions from the cluster "Person B" and the cluster "Person C" are from photos with the other face regions that are grouped in the common clusters. More particularly, the face regions from the clusters "Person B" and "Person A" appear in the same Image A, and the face regions from the clusters "Person C" and "Person A" appear in the same Image B. Although the clusters "Person B" and "Person C" are not identified as the same cluster in the previous analysis, the social information obtained from the group photos infer that the cluster "Person B" and the cluster "Person C" represent the same person. In Step 306 shown in FIG. 3, the degree of connection between any two clusters is modified according to the relationship of the face regions. Similarly, the face regions from the cluster "Person B", "Person D" and "Person E" appear in the same Image C, and the face regions from the clusters "Person C", "Person D" and "Person E" appear in the same Image D. Higher number of common faces in two clusters represents a higher degree of connection. Higher number of common persons from the same images, e.g. the face region R6 and the face region R7 are from the same Image C, may also represent higher degree of connection. In other words, the probability of the two clusters representing the same person is increased. Similarly, if faces of common clusters are from the same album, this may also represent higher degree of connection. Although the characteristics of persons would be changed as time passes, the cluster "Person B" and "Person C" are not identified as the same person according to the similarities of the face regions. However, the embodiment of current invention will improve the clustering result according to the social information of the group photos.

Figure 8:
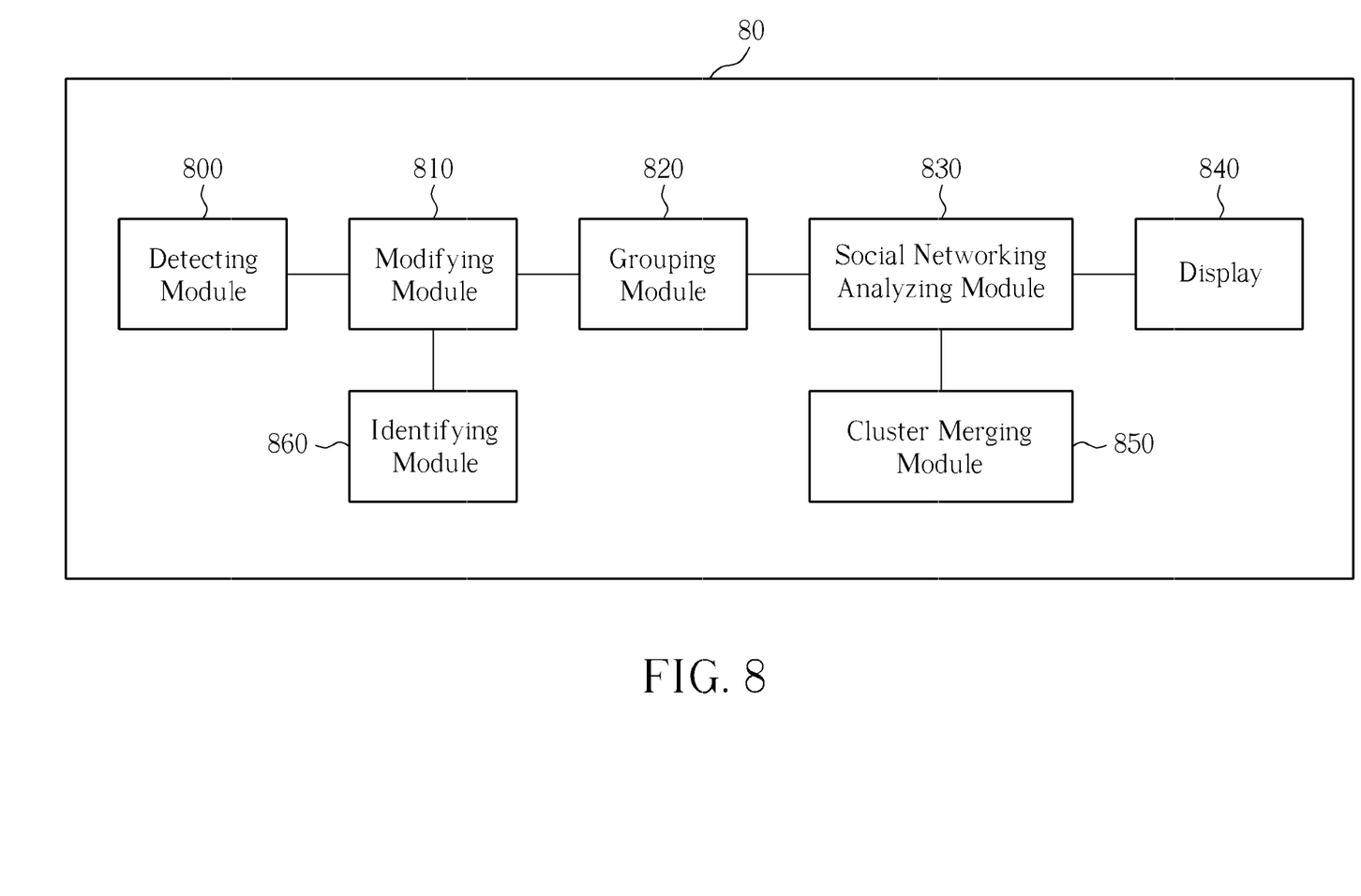
FIG. 8 is a diagram of a photo displaying system according to one embodiment.

Please refer to FIG. 8, which is a diagram of a photo displaying system 80 according to one embodiment. The photo displaying system 80 comprises a detecting module 800, a modifying module 810, a grouping module 820, a social networking analyzing module 830, a display 840, and a cluster merging module 850. The respective modules of the photo displaying system 80 may be implemented as software codes executable in an x86 computer platform, or as the logic modules in an FPGA, ASIC, or other kind of hardware to perform the respective method disclosed by the current invention. In the embodiment according to the current invention, the detecting module 800 may detect a plurality of face regions from a plurality of images. The grouping module 810 may group the face regions into a plurality of clusters based on similarity of the face regions. The social networking analyzing module 820 is for determining the degree of connection between the clusters according to the similarity between the face regions. The modifying module 830 may modify the degree of connection between the clusters based on the relationship of the clusters. The display 840 outputs the face regions according to the degree of connection. An identifying module 860 may identify a first image and a second image from the images. The first image comprises a first face region belonging to a first cluster and a second face region not belonging to the first cluster. The second image comprises a third face region belonging to a second cluster and a fourth face region not belonging to the second cluster. The modifying module 830 may modify the degree of connection between the first cluster and the second cluster if the second face region and the fourth face region are grouped into the same cluster. The modifying module 830 may also modify the degree of connection between the first cluster and the second cluster if the second face region is similar to the fourth face region. The modifying module 830 may increase the degree of connection between the first cluster and the second cluster if the second face region is similar to the fourth face region. The modifying module 830 may also modify the degree of connection between the first cluster and the second cluster if the similarity between the first face region and the third face region is greater than a similarity threshold. The cluster merging module 850 is for merging a first cluster and a second cluster of the plurality of clusters when the degree of connection between the first cluster and the second cluster is greater than a connection threshold.

By utilizing group photo history to increase the odds of correctly grouping multiple face regions of multiple digital images, the embodiments of the present invention reduce the likelihood that two different people will be assigned to the same cluster, and that the same person will be assigned to two or more different clusters.

Those skilled in the art will readily observe that numerous modifications and alterations of the device and method may be made while retaining the teachings of the invention.

What is claimed is:

1. A method of browsing face regions in digital images in a photo displaying system, the method comprising:
   detecting a plurality of face regions from a plurality of images;
   grouping the face regions into a plurality of clusters based on similarities of the face regions;
   determining a degree of connection between the clusters;
   modifying the degree of connection between the clusters according to a relationship of the face regions, wherein the step of modifying further comprises:
      identifying a first image from the images, wherein the first image comprises a first face region belonging to a first cluster and a second face region not belonging to the first cluster;
      identifying a second image from the images, wherein the second image comprises a third face region belonging to a second cluster and a fourth face region not belonging to the second cluster;
      determining whether the second face region from the first image is similar with the fourth face region from the second image; and
      modifying the degree of connection between the first cluster and the second cluster according to the determining result being true; and
   displaying the face regions according to the degree of connection between the clusters.

2. The method of claim 1, wherein the step of determining the degree of connection between the clusters comprises:
   selecting one of the similarities of the face regions.

3. The method of claim 1, wherein the relationship of a first face region and a second face region is created if the first face region and the second face region are detected from the same image.

4. The method of claim 1, wherein the step of
determining further comprises: determining whether the second face region from the first image and the fourth face region from the second images are grouped into the same cluster.

5. The method of claim 1, wherein the degree of connection between the first cluster and the second cluster is increased if the determining result is true.

6. The method of claim 1, wherein the step of modifying the degree of connection between the clusters according to the relationship of the face regions further comprises:
determining whether the similarity between the first face region and the third face region is greater than a similarity threshold; and
modifying the degree of connection between the first cluster and the second cluster if the similarity the similarity between the first face region and the third face region is greater than the similarity threshold.

7. The method of claim 1, further comprising:
merging a first cluster and a second cluster when the degree of connection between the first cluster and the second cluster is greater than a connection threshold.

8. The method of claim 1, wherein displaying the face regions according to the degree of connection between the clusters is displaying the face regions in descending order of the degree of connection between the clusters.

9. A method of handling similar clusters, the method comprising:
analyzing a plurality of images to generate a plurality of face regions;
grouping the plurality of face regions into a plurality of clusters, wherein the clusters comprise a first cluster, a second cluster and a third cluster;
generating a first condition result when a first face region of the first cluster appears with a third face region of the third cluster in a first image of the plurality of images, and a second face region of the second cluster appears with a fourth face region of the third cluster in a second image of the plurality of images;
generating a second condition result when degree of connection of the first cluster and the second cluster is greater than a connection threshold; and
increasing the degree of connection between the first cluster and the second cluster when the first condition result is true and the second condition result is true.

10. The method of claim 9, further comprising:
calculating facial similarity for each pair of face regions in the plurality of images, wherein the step of grouping the plurality of face regions into a plurality of clusters is based on the facial similarities.

11. The method of claim 9, further comprising:
merging the first cluster and the second cluster when the first condition result is true and the second condition result is true.

12. The method of claim 9, further comprising:
decreasing separation of the first cluster and the second cluster during display of the first cluster and the second cluster when the first condition result is true and the second condition result is true.

13. The method of claim 9, further comprising:
displaying the plurality of clusters in descending order of degrees of connections between the first cluster and each of the plurality of clusters.

14. A photo displaying system comprising:
a detecting module for detecting a plurality of face regions from a plurality of images;
a grouping module for grouping the face regions into a plurality of clusters based on a similarity of the face regions;
a social networking analyzing module for determining a degree of connection between the clusters according to the similarity between the face regions;
an identifying module for identifying a first image and a second image from the images, wherein the first image comprises a first face region belonging to a first cluster and a second, face region not belonging to the first cluster, and the second image comprises a third face region belonging to a second cluster and a fourth face region not belonging to the second cluster;
a modifying module for modifying the degree of connection between the clusters based on a relationship of the clusters; wherein the modifying module modifies the degree of connection between the first cluster and the second cluster if the second face region is similar to the fourth face region or if the second face region and the fourth face region are grouped into the same cluster; and
a display for outputting the face regions according to the degree of connection.

15. The photo displaying system of claim 14, further comprising:
a cluster merging module for merging a first cluster and a second cluster of the plurality of clusters when the degree of connection between the first cluster and the second cluster is greater than a connection threshold.

16. The photo displaying system of claim 14, wherein the modifying module increases the degree of connection between the first cluster and the second cluster if the second face region is similar to the fourth face region.

17. The photo displaying system of claim 14, wherein the modifying module modifies the degree of connection between the first cluster and the second cluster if the similarity between the first face region and the third face region is greater than a similarity threshold.

* * * * *